(12) United States Patent
Abe et al.

(10) Patent No.: US 9,793,045 B2
(45) Date of Patent: Oct. 17, 2017

(54) CONTACTLESS POWER TRANSFER TRANSFORMER FOR MOVING BODY

(71) Applicant: TECHNOVA INC., Tokyo (JP)

(72) Inventors: Shigeru Abe, Hyogo (JP); Yasuyoshi Kaneko, Saitama (JP); Tomio Yasuda, Saitama (JP); Hiroyuki Kishi, Tokyo (JP)

(73) Assignee: TECHNOVA INC., Tokyo (JP)

( * ) Notice: Subject to any disclaimer, the term of this patent is extended or adjusted under 35 U.S.C. 154(b) by 429 days.

(21) Appl. No.: 14/401,982

(22) PCT Filed: May 21, 2013

(86) PCT No.: PCT/JP2013/064133
§ 371 (c)(1),
(2) Date: Nov. 18, 2014

(87) PCT Pub. No.: WO2013/176152
PCT Pub. Date: Nov. 28, 2013

(65) Prior Publication Data
US 2015/0123486 A1     May 7, 2015

(30) Foreign Application Priority Data

May 21, 2012  (JP) .................................. 2012-116090

(51) Int. Cl.
*H02J 50/70*        (2016.01)
*H01F 38/14*        (2006.01)
(Continued)

(52) U.S. Cl.
CPC ................ *H01F 38/14* (2013.01); *B60L 1/02* (2013.01); *B60L 5/00* (2013.01); *B60L 11/182* (2013.01);
(Continued)

(58) Field of Classification Search
CPC . H02J 5/005; H02J 7/025; H02J 17/00; B60L 11/182
See application file for complete search history.

(56) References Cited

U.S. PATENT DOCUMENTS 5,528,113 A   6/1996  Boys et al.
5,821,638 A   10/1998 Boys et al.
(Continued)

FOREIGN PATENT DOCUMENTS

CN   101461114 A   6/2009
CN   102341871 A   2/2012
(Continued)

OTHER PUBLICATIONS

English Machine Tranlation of JP2011049230A, published Mar. 10, 2011.*
(Continued)

*Primary Examiner* — Rexford Barnie
*Assistant Examiner* — David Shiao
(74) *Attorney, Agent, or Firm* — Rothwell, Figg, Ernst & Manbeck, P.C.

(57) ABSTRACT

According to one embodiment, contactless power transfer transformer includes power transmission coil and power reception coil. At least one of the power transmission coil and the power reception coil is configured by coupled and both-sides wound coil. The coupled and both-sides wound coil is configured by both-sides wound coils. One of magnetic poles of one of the both-sides wound coils is connected to one of the magnetic poles of adjacent one of the both-sides wound coils. Directions of magnetic fluxes toward corresponding coil from each of the magnetic poles connected to each other are identical. The both-sides wound coils are selected so that leakage magnetic flux around moving body does not exceed predetermined value. Number (Continued)

of the both-sides wound coils is set so that value obtained by multiplying power transfer capacity of one of the both-sides wound coils by the number satisfies capacity of the transformer.

12 Claims, 19 Drawing Sheets

(51) Int. Cl.
| | | |
|---|---|---|
| *B60L 1/02* | (2006.01) | |
| *B60L 11/18* | (2006.01) | |
| *H01F 27/255* | (2006.01) | |
| *B60L 5/00* | (2006.01) | |
| *H02J 17/00* | (2006.01) | |

(52) U.S. Cl.
CPC ......... *B60L 11/185* (2013.01); *B60L 11/1833* (2013.01); *H01F 27/255* (2013.01); *H02J 17/00* (2013.01); *H02J 50/70* (2016.02); *B60L 2240/36* (2013.01); *B60L 2270/147* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | | |
|---|---|---|---|---|
| 7,411,479 | B2* | 8/2008 | Baarman | A61L 2/10 336/198 |
| 2007/0029965 | A1* | 2/2007 | Hui | H01F 38/14 320/112 |
| 2009/0303749 | A1 | 12/2009 | Boys et al. | |
| 2012/0025605 | A1 | 2/2012 | Schneider et al. | |
| 2012/0074899 | A1* | 3/2012 | Tsai | H02J 7/025 320/108 |
| 2012/0217111 | A1* | 8/2012 | Boys | H01F 38/14 191/10 |
| 2013/0093253 | A1* | 4/2013 | Norconk | H02J 5/005 307/104 |
| 2013/0093386 | A1* | 4/2013 | Tsai | H02J 5/005 320/108 |
| 2013/0314188 | A1* | 11/2013 | Jitaru | H01F 38/14 336/119 |
| 2015/0102684 | A1 | 4/2015 | Tanaka et al. | |

FOREIGN PATENT DOCUMENTS

| | | | |
|---|---|---|---|
| CN | 104335450 | A | 2/2015 |
| EP | 2 682 959 | A2 | 1/2014 |
| EP | 2 848 454 | A1 | 3/2015 |
| EP | 2 849 314 | A1 | 3/2015 |
| JP | 7-170681 | A | 7/1995 |
| JP | 8-241384 | A | 9/1996 |
| JP | 2002-78250 | A | 3/2002 |
| JP | 2003-86441 | A | 3/2003 |
| JP | 2008-87733 | A | 4/2008 |
| JP | 2010-172084 | A | 8/2010 |
| JP | 2011-50127 | A | 3/2011 |
| JP | 2011049230 | A * | 3/2011 |
| JP | 2011-176914 | A | 9/2011 |
| JP | 2012-80671 | A | 4/2012 |
| JP | 2012-99644 | A | 5/2012 |
| WO | 2007/126321 | A1 | 11/2007 |

OTHER PUBLICATIONS

Decision of Patent Grant dated Jan. 19, 2016 in corresponding Japanese Patent Application No. 2014-516819 (with an English translation) (4 pages).

Communication and Extended European Search Report dated Feb. 5, 2016 in corresponding European Patent Application No. 13793139.0 (15 pages).

International Search Report dated Aug. 27, 2013 in PCT/JP2013/064133.

* cited by examiner

| DISTANCE IN x-DIRECTION [mm] | LEAKAGE MAGNETIC FLUX DENSITY[μT] | DISTANCE IN y-DIRECTION [mm] | LEAKAGE MAGNETIC FLUX DENSITY[μT] |
|---|---|---|---|
| 280 | 3570 | 150 | 4450 |
| 480 | 177.5 | 350 | 470 |
| 780 | 16.5 | 650 | 28.5 |
| 1080 | 3.88 | 950 | 6.51 |
| 1280 | 2.03 | 1150 | 2.96 |
| 1480 | 1.14 | 1350 | 1.65 |
| 1780 | 0.51 | 1650 | 0.77 |
| 2080 | 0.29 | 1950 | 0.41 |
| 2280 | 0.21 | 2150 | 0.31 |

| DISTANCE IN x-DIRECTION [mm] | LEAKAGE MAGNETIC FLUX DENSITY [μT] | DISTANCE IN y-DIRECTION [mm] | LEAKAGE MAGNETIC FLUX DENSITY [μT] |
|---|---|---|---|
| 140 | 3600 | 150 | 2540 |
| 340 | 540 | 350 | 288 |
| 640 | 53 | 650 | 40.7 |
| 1140 | 10.7 | 1150 | 13.3 |
| 2140 | 2.18 | 2150 | 4.04 |

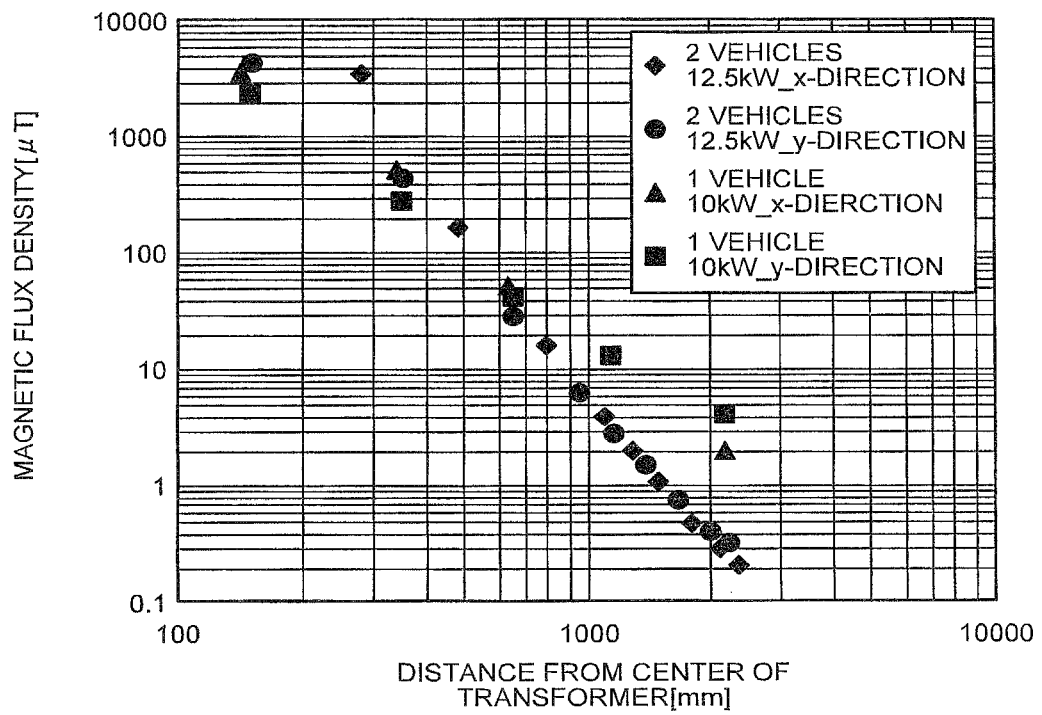

CONTACTLESS POWER TRANSFER TRANSFORMER FOR MOVING BODY

CROSS REFERENCE TO RELATED APPLICATION

This application is a 35 U.S.C. 371 National Phase Entry Application from PCT/JP2013/064133, filed May 21, 2013, which claims priority to Japanese Patent Application No. 2012-116090, filed May 21, 2012, the disclosures of which are incorporated herein in their entirety by reference.

TECHNICAL FIELD

The present invention relates to a contactless power transfer transformer for a moving body, which transfers power to a moving body such as an electrical vehicle in a contactless manner. The present invention relates to a transformer that can easily increase its capacity while avoiding influence on health due to magnetic field exposure, as well as that is compatible with different types of contactless power transfer transformer.

BACKGROUND ART

As a system for charging a battery of an electric vehicle or a plug-in hybrid car, there has been developing a method that transfers power to the vehicle in contactless manner by using electromagnetic induction, as illustrated in FIG. 17. Such a method transfers power from a primary transformer (power transmission coil) 10 installed on the ground to a secondary transformer (power reception coil) 20 of the contactless power transfer transformer, installed on a floor of the vehicle.

In the following Patent Literature 1, as the power transmission coil and the power reception coil of the contactless power transfer transformer used in this system, there is disclosed a configuration in which an electric wiring is wound in a flattened circle and provided on one face of a flat plate ferrite magnetic core 21, 31, as illustrated in FIGS. 18A and 18B. Such a coil is referred to as "one-side wound coil" since the winding wires 22, 23 are wound only at one side of the ferrite magnetic cores 21, 31. FIG. 18A is a cross sectional view of the power transmission coil and the power reception coil, and FIG. 18B is a plan view of the power transmission coil and the power reception coil.

The power transfer efficiency of the contactless power transfer transformer that uses the one-side wound coil largely decreases when a vehicle is stopped at a position different from a vehicle stop position and the power transmission coil and the power reception coil do not oppose each other, or when a gap between the power transmission coil and the power reception coil changes. In order to increase the permissible amount with respect to the positional variation or the gap variation, it becomes necessary to increase the sizes of the power transmission coil and the power reception coil.

In the following Patent Literature 2, there is disclosed a contactless power transfer transformer with large permissible amount for the positional variation and the gap variation and that can be configured small in size. As illustrated in FIGS. 20A and 20B 19A and 19B, in such a contactless power transfer transformer, the power transmission coil and the power reception coil are configured by winding the winding wires 62, 64 around the ferrite cores 61, 63. Such a coil is referred to as "both-sides wound coil". Further, as illustrated in FIG. 19B, the "square core" is used as the ferrite cores 61, 63. FIG. 19A is a cross sectional view of the power transmission coil and the power reception coil, and FIG. 19B is a plan view of the power transmission coil and the power reception coil.

In the contactless power transfer transformer, a main magnetic flux 67 that circles around the magnetic pole portions of the ferrite cores 61, 63 is generated. Additionally, bypassing leakage magnetic fluxes 68, 69 are generated on the non-opposing sides of the power transmission coil and the power reception coil. If the leakage magnetic fluxes 68, 69 enter an iron plate or the like of the floor of the vehicle, induced current flows through the iron plate and the iron plate is heated, thereby the power transfer efficiency decreases. In order to avoid the decrease in the power transfer efficiency, it is required to magnetically shield the leakage magnetic fluxes 68, 69 by arranging non-magnetic good conductors 65, 66 such as an aluminum plate at back faces of the power transmission coil and the power reception coil.

Further, in the following Patent Literature 3, in order to further decrease a size and weight of the both-sides wound coil, there is disclosed a power transmission coil and a power reception coil as illustrated in FIGS. 20A to 20F. According to such a power transmission coil and a power reception coil, a ferrite core is configured in H-shape, parts 41 and 42 arranged at both ends of the H-shape and being parallel to each other are provided as magnetic pole portions, and a winding wire 50 is wound around a part 43 (the part connects between the magnetic pole portions, and is also referred to as a wound portion) corresponding to a horizontal pole of the H-shape. FIG. 20A is a state in which the winding wire 50 is wound around the ferrite core 40, and FIG. 20D is a state in which the winding wire 50 is not wound around the ferrite core 40. Further, FIG. 20B is a cross sectional view taken along a line A-A of FIG. 20A, and FIG. 20C is a cross sectional view taken along a line B-B of FIG. 20A. Similarly, FIG. 20E is a cross sectional view taken along a line A-A of FIG. 20D, and FIG. 20F is a cross sectional view taken along a line B-B of FIG. 20D.

Here, a case is considered in which the power transmission coil and the power reception coil each configured by a both-sides wound coil by using this H-shape core are arranged to oppose each other with a spacing therebetween at a normal gap length of 70 mm and the power transfer of 3 kW is performed. In such a case, the following power transfer properties are obtained. In particular, the efficiency of the transformer is 95%, the permissible amount of positional variation in the left and right direction (y-direction in FIG. 20A) is ±150 mm, the permissible amount of positional variation in the front and back direction (x-direction in FIG. 20A) is ±60 mm, and the efficiency at which the normal gap length is increased to 100 mm is 92%.

CITATION LIST

Patent Literature

Patent Literature 1: Japanese Patent Application Laid-open No. 2008-87733
Patent Literature 2: Japanese Patent Application Laid-open No. 2010-172084
Patent Literature 3: Japanese Patent Application Laid-open No. 2011-50127

SUMMARY OF INVENTION

Problem to be Solved by the Invention

For the contactless power transfer of the moving body, fast charge that enables the power transfer at short time and power transfer targeting large electric vehicles are desired. In this regard, it is necessary to increase capacity of the contactless power transfer transformer. However, in order to increase the capacity, it is necessary to take into account the influence of a leakage magnetic field on human body and/or the like.

According to the contactless power transfer transformer that uses the both-sides wound coil, the permissible amount of the positional variation, the gap variation between the power transmission coil and the power reception coil, and/or the like is large. This means that, from a slightly different angle, the magnetic field (leakage magnetic field) diffusing to the surrounding is larger than the one-side wound coil.

Therefore, for the contactless power transfer transformer that uses the both-sides wound coil, it is particularly necessary to take care of the leakage magnetic field.

One aspect of the present invention is made in view of the foregoing, and an object of one aspect of the present invention is to provide a contactless power transfer transformer for a moving body, which is capable of increasing capacity of the transformer while suppressing the leakage magnetic field.

Means for Solving Problem

According to one aspect of the present invention, a contactless power transfer transformer for a moving body includes a power transmission coil and a power reception coil. The power reception coil is installed at a position at which the moving body is installed (e.g., as illustrated in FIG. 18). Contactless power transfer is performed when the moving body is moved to a power transfer position at which the power transmission coil and the power reception coil oppose each other. At least one of the power transmission coil and the power reception coil is configured a coupled and both-sides wound coil. The coupled and both-sides wound coil is configured by combining a plurality of single both-sides wound coils. A winding wire is wound around a wound portion between magnetic pole portions of a core in each of the single both-sides wound coils. In the coupled and both-sides wound coil, the single both-sides wound coils are combined so that each wound portion of the single both-sides wound coils is arranged linearly with respect to each other, one of the magnetic pole portions of one of the single both-sides wound coils is connected to one of the magnetic pole portions of adjacent one of the single both-sides wound coils, and directions of magnetic fluxes in a vertical direction toward a corresponding coil from each of the magnetic pole portions connected to each other are identical. Each of the single both-sides wound coils is selected so that a leakage magnetic flux around the moving body of when the coupled and both-sides wound coil configured by two single both-sides wound coils is arranged at the install position of the moving body does not exceed a predetermined value. A number of the single both-sides wound coils configuring the coupled and both-sides wound coil is set so that a value obtained by multiplying power transfer capacity of one of the selected single both-sides wound coils by the number satisfies power transfer capacity of the contactless power transfer transformer.

According to the coupled and both-sides wound coil configured by the two single both-sides wound coils, the leakage magnetic fields generated by each of the single both-sides wound coils cancel each other at a location far away. Thus, the strength of the leakage magnetic field largely decreases. The principle therebehind is considered similar to the principle in which the attenuation characteristic of the leakage magnetic field is good for the one-side wound coil of FIG. 18. Therefore, when the single both-sides wound coil that configures the coupled and both-sides wound coil is selected, a coupled and both-sides wound coil configured by two single both-sides wound coils are placed at an install position, and single both-sides wound coils that satisfy a condition of leakage magnetic field is selected. A number of the single both-sides wound coils to be used for the coupled and both-sides wound coil is desired to be an even number in order to reduce the leakage magnetic flux. However, if the leakage magnetic field is not an issue, the coupled and both-sides wound coil may be configured by an odd number of the single both-sides wound coils.

Further, in the contactless power transfer transformer for the moving body according to another aspect of the present invention, the power reception coil configured by the coupled and both-sides wound coil can be installed at an install position at a bottom face of the moving body so that an arrangement direction of the single both-sides wound coils in the coupled and both-sides wound coil coincides with a front and back direction of the moving body.

According to the both-sides wound coil, the permissible amount of the positional variation in a direction parallel to a pair of the magnetic pole portions is smaller than the permissible amount of the positional variation in a direction (i.e., an array direction of the both-sides wound coils) perpendicular to the pair of the magnetic pole portions. Therefore, a front and back direction of the moving body, which is a direction easier to provide solutions (for example, a tire block) for preventing the positional variation, can be made to coincide with a direction toward which the permissible level of the positional variation is low.

Further, in the contactless power transfer transformer for the moving body according to still another aspect of the present invention, each of the single both-sides wound coils may include an H-shape core in which the wound portion is arranged at a middle part between a pair of the parallel magnetic pole portions.

By using the H-shape core, an amount of ferrite is reduced, and it becomes capable of reducing the weight, the size, and the cost. Further, the length of the magnetic pole portion (the length of the H-shape in the longitudinal direction) can be increased to increase the permissible amount of the positional variation or the gap variation.

Further, in the contactless power transfer transformer for the moving body according to still another aspect of the present invention, if a width in the arrangement direction of the single both-sides wound coils of the coupled and both-sides wound coil and obtained by adding widths of the connected magnetic pole portions (width of the single both-sides wound coil in the arrangement direction) is D1, and if a width of the magnetic pole portion positioned at an end portion of the coupled and both-sides wound coil is D2, D1<2×D2 to shorten the length of the coupled and both-sides wound coil in the arrangement direction.

At the position at which the single both-sides wound coils are adjacent to each other, the width becomes doubled since the magnetic pole portions of the two single both-sides wound coils are connected with each other. Therefore, a width of a single magnetic pole portion may be thin.

Further, in the contactless power transfer transformer for the moving body according to still another aspect of the present invention, the power transmission coil and the power reception coil may each be configured by the coupled and both-sides wound coil that is configured by combining the two single both-sides wound coils, in the coupled and both-sides wound coil of one of the power transmission coil and the power reception coil, winding wires of the two single both-sides wound coils may be electrically connected to each other in series, and in the coupled and both-sides wound coil of other one of the power transmission coil and the power reception coil, the winding wires of the two both-sides wound coils may be electrically connected to each other in parallel.

When winding wires of a plurality of the single both-sides wound coils that configure the power transmission coil and the power reception coil are connected only in series, the currents flowing through the winding wires connected in series become the same. Therefore, even if the position varies between the power transmission coil and the power reception coil, the power of the power transfer of each of the single both-sides wound coils is hardly unbalanced. However, the voltage becomes high, and therefore, it is difficult to handle. On the other hand, if the winding wires of the plurality of the single both-sides wound coils are connected only in parallel, the voltage becomes low, but the power of the power transfer of each of the both-sides wound coils is unbalanced when the position variation occurs. Therefore, by combining the series and the parallel connections, the current can be balanced while suppressing the increase in the voltage.

Further, in the contactless power transfer transformer for the moving body according to still another aspect of the present invention, the power transmission coil and the power reception coil may each be configured by the coupled and both-sides wound coil that is configured by combining m pairs of the two single both-sides wound coils, in the coupled and both-sides wound coil of one of the power transmission coil and the power reception coil, the winding wires of each of the two single both-sides wound coils in each of the m pairs of the two single both-sides wound coils may be electrically connected to each other in series, and winding wires of each of the m pairs of the two single both-sides wound coils may be electrically connected to each other in parallel, and in the coupled and both-sides wound coil of other one of the power transmission coil and the power reception coil, the winding wires of each of the two single both-sides wound coils in each of the m pairs of the two single both-sides wound coils may be electrically connected to each other in parallel, and the winding wires of each of the m pairs of the two single both-sides wound coils may be electrically connected to each other in parallel.

By putting the series connection in the parallel connection, the current can be balanced.

Further, in the contactless power transfer transformer for the moving body according to still another aspect of the present invention, the power transmission coil and the power reception coil may both be configured by the coupled and both-sides wound coil configured by combining m pairs of the two single both-sides wound coils, and in the coupled and both-sides wound coil, the winding wires of each of the two single both-sides wound coils in each of the m pairs of the two single both-sides wound coils may be electrically connected to each other in series, and the winding wires of each of the m pairs of the single both-sides wound coils are electrically connected to each other in parallel.

By putting the series connection in the parallel connection, the currents can be balanced.

Further, in the contactless power transfer transformer for the moving body according to still another aspect of the present invention, one of the power transmission coil and the power reception coil may be configured by the coupled and both-sides wound coil that is configured by combining the two single both-sides would coils, and other one of the power transmission coil and the power reception coil may be configured by a one-side wound coil in which an electric wire is wound in a flattened circle at one face of a flattened plate ferrite magnetic core.

As described above, the coupled and both-sides wound coil that is configured by combining the two single both-sides wound coils can perform the power transfer not only with respect to the same type of coupled and both-sides wound coil but also with respect to one-side wound coil.

Effect of the Invention

According to a contactless power transfer transformer for a moving body of one aspect of the present invention, capacity can easily be increased while suppressing the leakage magnetic field. Further, it is possible to perform power transfer not only with respect to the same type of both-sides wound coil but also with respect to different type of one-side wound coil. Therefore, the contactless power transfer transformer for a moving body of the present invention is compatible with the one-side wound coil.

BRIEF DESCRIPTION OF DRAWINGS

FIG. 11 is a graph comparing the measurement results of FIGS. 9B and 10B;

FIG. 12 is a diagram illustrating an equation indicating a best fit curve of a change in the magnetic flux density of FIG. 11;

MODE(S) FOR CARRYING OUT THE INVENTION

Figure 1A:
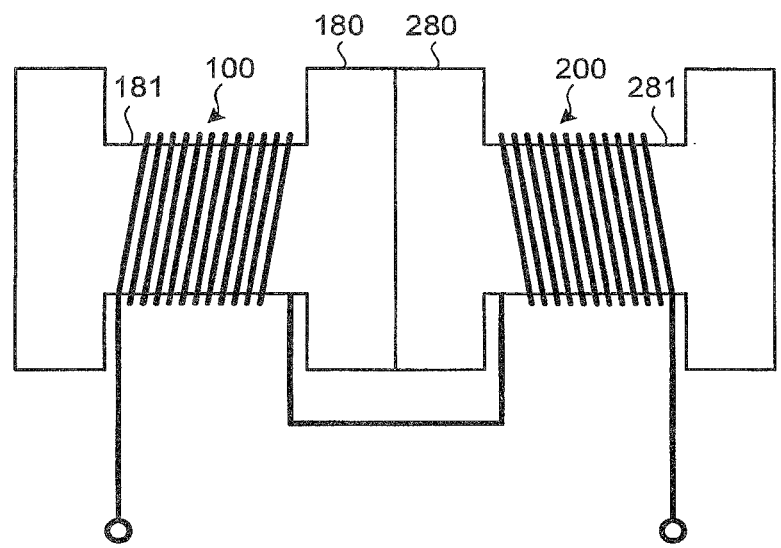
FIG. 1A is a diagram illustrating a state in which single both-sides wound coils each having a winding wire direction opposite each other are connected to each other in series, in a contactless power transfer transformer according to an embodiment.
Figure 1B:
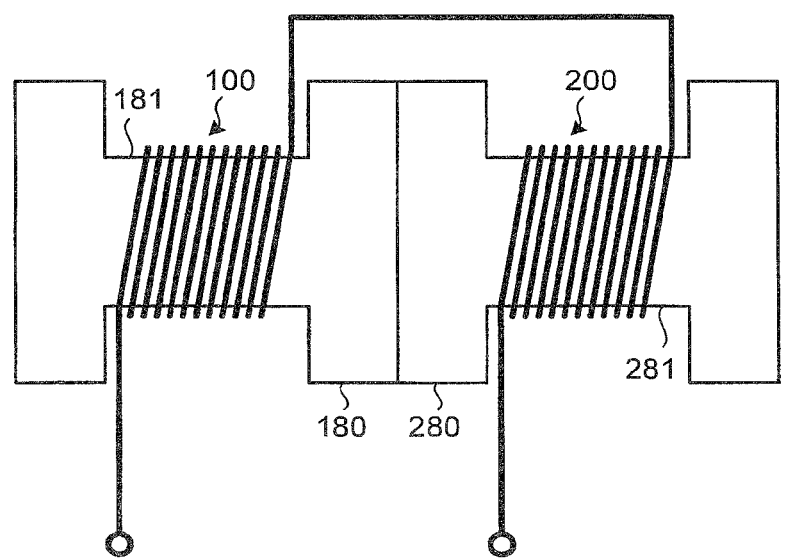
FIG. 1B is a diagram illustrating a state in which single both-sides wound coils each having the same winding wire direction are connected to each other in series, in the contactless power transfer transformer according to the embodiment.

FIG. 1A and FIG. 1B schematically illustrates a power transmission coil of a moving body contactless power transfer transformer according to an embodiment of the present embodiment. A power reception coil has the same configuration.

The power transmission coil is configured by a coupled and both-sides wound coil in which two single both-sides wound coils 100, 200 are combined.

Figure 7A:
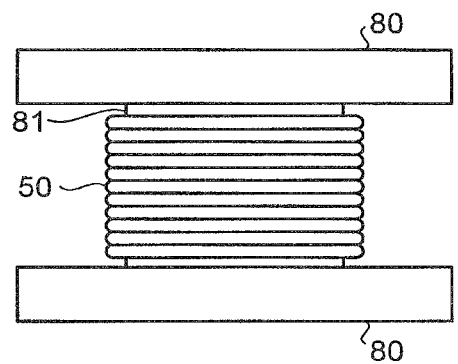
FIG. 7A is a plan view illustrating a configuration of the single both-sides wound coil.
Figure 7B:
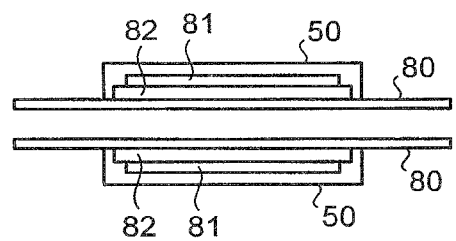
FIG. 7B is a side view of when the single both-sides wound coils are arranged opposite each other.

The single both-sides wound coils 100, 200 are configured such that a litz wire is wound around a wound portion of an H-shape core. In particular, as illustrated in FIGS. 7A and 7B, the H-shape core is configured by: a pair of magnetic pole cores 80 that are parallel to each other; and a winding wire core 81 that is orthogonal to the magnetic pole cores 80. Both the magnetic pole cores 80 and the winding wire core 81 are ferrite cores.

A winding wire portion 50 around which an electric wire is wound is attached at the middle of the winding wire core 81. Both ends of a ferrite plate protruding from both sides of the winding wire portion 50 are connected to the magnetic pole cores 80 via bottom-layer ferrite plates 82.

Figure 7C:
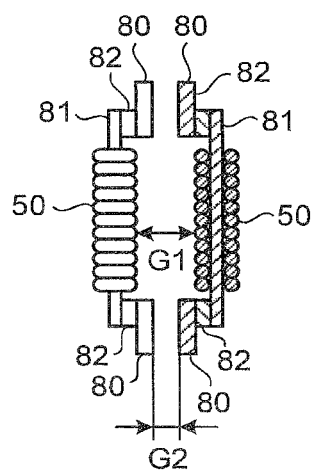
FIG. 7C is a diagram for explaining a case when the single both-sides wound coils are arranged opposite each other, and illustrating one of the single both-sides wound coils arranged opposite each other as a cross sectional diagram.

As illustrated in FIG. 7C, the bottom-layer ferrite plates 82 are laminated at a side opposing a corresponding coil so as to raise a height of the upper most portion of the magnetic pole cores 80 to the height of the winding wire portion 50 or greater. The magnetic pole cores 80 are arranged above the bottom-layer ferrite plate.

As described above, the "legs" formed by the bottom-layer ferrite plate 82 is attached to the magnetic pole parts of the magnetic pole cores 80. Accordingly, a magnetic gap length G2 can be set to a length the same as a length of spacing G1 of the winding wire portion 50 or shorter. As described above, by making the magnetic gap length short, a coupling coefficient between the coils becomes high and the power transfer efficiency and the maximum power transfer power increase.

As illustrated in FIGS. 1A and 1B, in the two single both-sides wound coils 100, 200, the magnetic pole core 180 of the single both-sides wound coil 100 is arranged and connected to a magnetic pole core 280 of an adjacent single both-sides wound coil 200. Further, a winding wire core 181 of the single both-sides wound coil 100 is combined with a winding wire core 281 of the adjacent single both-sides wound coil 200 so as to be next to each other in linear manner.

Figure 2:
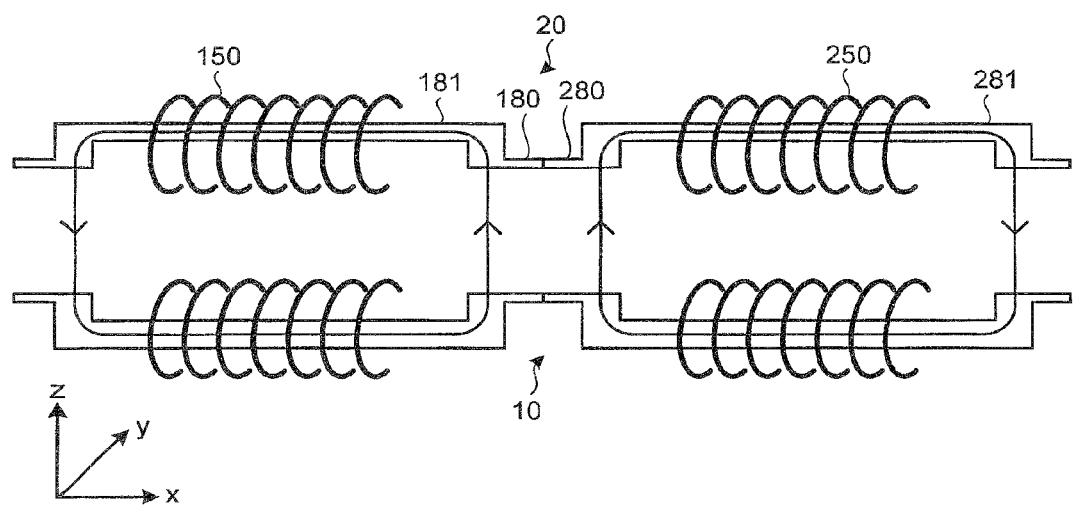
FIG. 2 is a diagram illustrating a main magnetic flux of the contactless power transfer transformer according to the embodiment.

FIG. 2 illustrates a main magnetic flux between the power transmission coil 10 and the power reception coil 20 which are each configured by a coupled and both-sides wound coil in which two single both-sides wound coils are combined. In each of the power transmission coil 10 and the power reception coil 20, currents flow such that: a direction of the main magnetic flux through the winding wire core 181 is opposite a direction of the main magnetic flux through the winding wire core 281; and directions of the main magnetic fluxes to the opposing coil from each of the magnetic pole cores 180, 280 that are arranged and connected with each other become the same.

As described above, the directions of the main magnetic fluxes in the vertical direction toward the corresponding coil from the magnetic pole cores 180, 280 arranged and connected with each other are set to be the same. Consequently, the magnetic field between the power transmission coil 10 and the power reception coil 20 becomes stronger, and the power transfer power increases. The power transfer power of the coupled and both-sides wound coil in which a plurality of single both-sides wound coils are combined increases as a number of the both-sides wound coils increases, in proportional manner.

On the other hand, in the coupled and both-sides wound coil in which the two single both-sides wound coils are combined with each other, the leakage magnetic fields generated by each of the single both-sides wound coils cancel each other at a location far away. Thus, the strength of the leakage magnetic field largely decreases.

Figure 8:
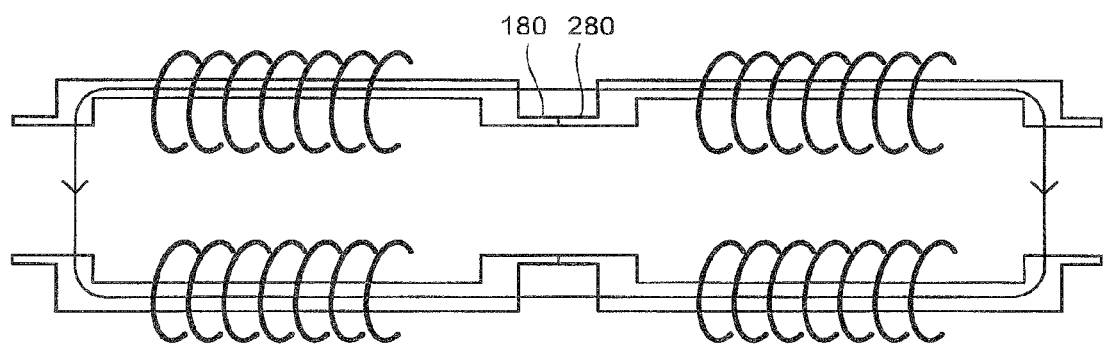
FIG. 8 is a diagram for explaining a state in which electrical power of power transfer does not increase even when the single both-sides wound coils are connected.

Here, as illustrated in FIG. 8, if the direction of the main magnetic flux in the vertical direction toward the corresponding coil from the magnetic pole core 180 is opposite the direction of the main magnetic flux in the vertical direction toward the corresponding coil from the magnetic pole core 280, the main magnetic fluxes in the vertical direction cancel each other. Thus, even if a plurality of the single both-sides wound coils are combined, the power transfer power cannot be increased.

FIG. 1A illustrates a case in which winding wires of the two single both-sides wound coils 100, 200 are connected to each other in series while winding wire directions of the two single both-sides wound coils 100, 200 are made opposite each other, in order to increase the power transfer power of the coupled and both-sides wound coil to be double the power transfer power of the single both-sides wound coil. Further, FIG. 1B illustrates a case in which the winding wires of the two single both-sides wound coils 100, 200 are connected to each other in series while winding wire directions of the two single both-sides wound coils 100, 200 are made the same, in order to increase the power transfer power of the coupled and both-sides wound coil to be double the power transfer power of the single both-sides wound coil.

Figure 3A:
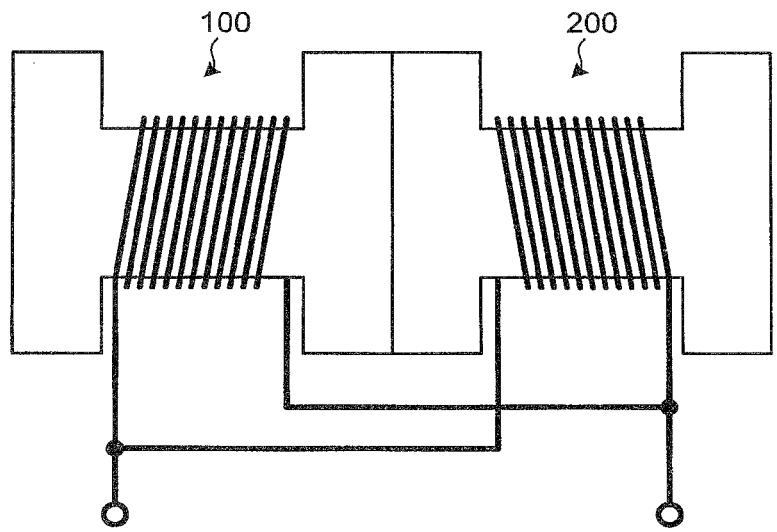
FIG. 3A is a diagram illustrating a state in which single both-sides wound coils each having a winding wire direction opposite each other are connected to each other in parallel, in the contactless power transfer transformer according to the embodiment.
Figure 3B:
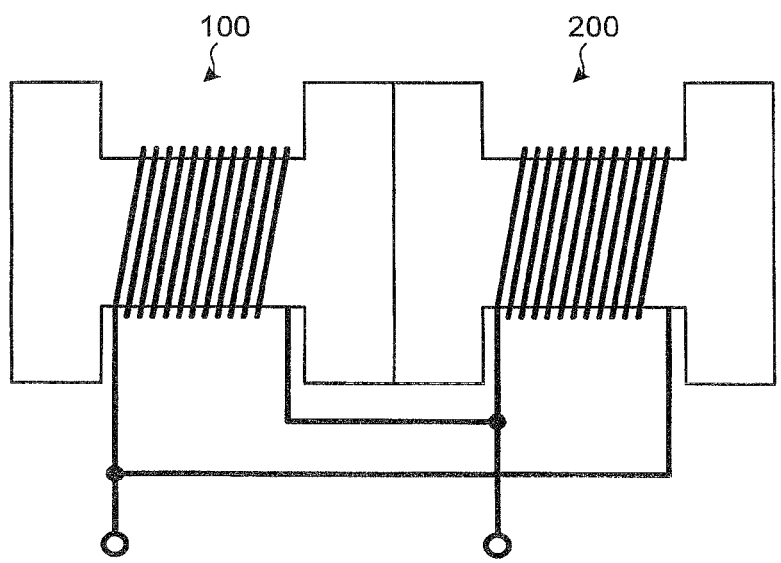
FIG. 3B is a diagram illustrating a state in which single both-sides wound coils each having the same winding wire direction are connected to each other in parallel, in the contactless power transfer transformer according to the embodiment.

Further, FIG. 3A illustrates a case in which winding wires of the two single both-sides wound coils 100, 200 are connected to each other in parallel while winding wire directions of the two single both-sides wound coils 100, 200 are made opposite each other, in order to increase the power transfer power of the coupled and both-sides wound coil to be double the power transfer power of the single both-sides wound coil. Further, FIG. 3B illustrates a case in which the winding wires of the two single both-sides wound coils 100, 200 are connected to each other in parallel while winding wire directions of the two single both-sides wound coils 100, 200 are made the same, in order to increase the power transfer power of the coupled and both-sides wound coil to be double the power transfer power of the single both-sides wound coil.

Figure 4:
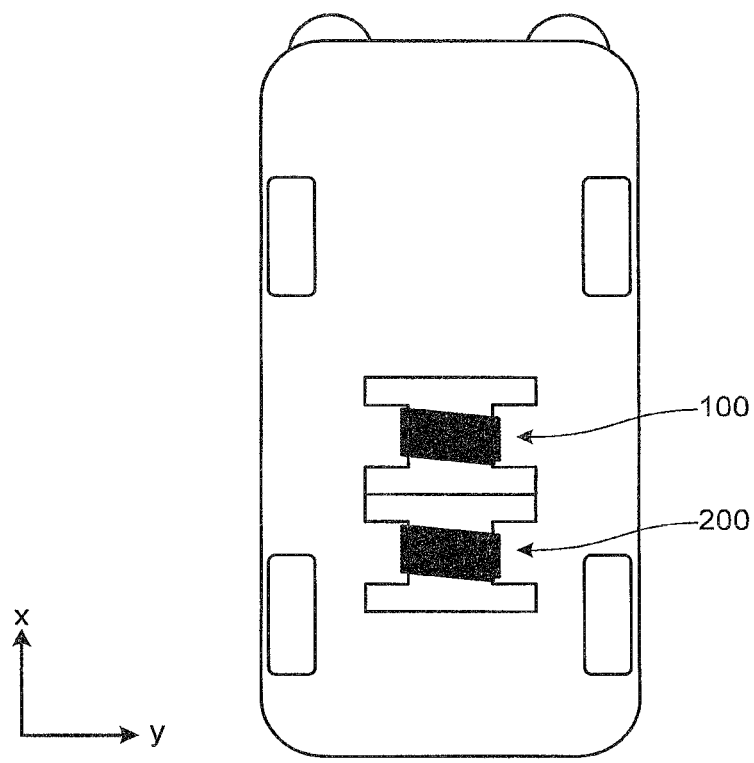
FIG. 4 is a diagram illustrating a direction in which a power reception coil is attached to a vehicle, according to the embodiment.

As illustrated in FIG. 4, the power reception coil configured by the coupled and both-sides wound coil is installed at an install position on an underfloor surface of the vehicle such that an arrangement direction of the single both-sides wound coils coincides with a back and front direction of the vehicle.

Figure 5:
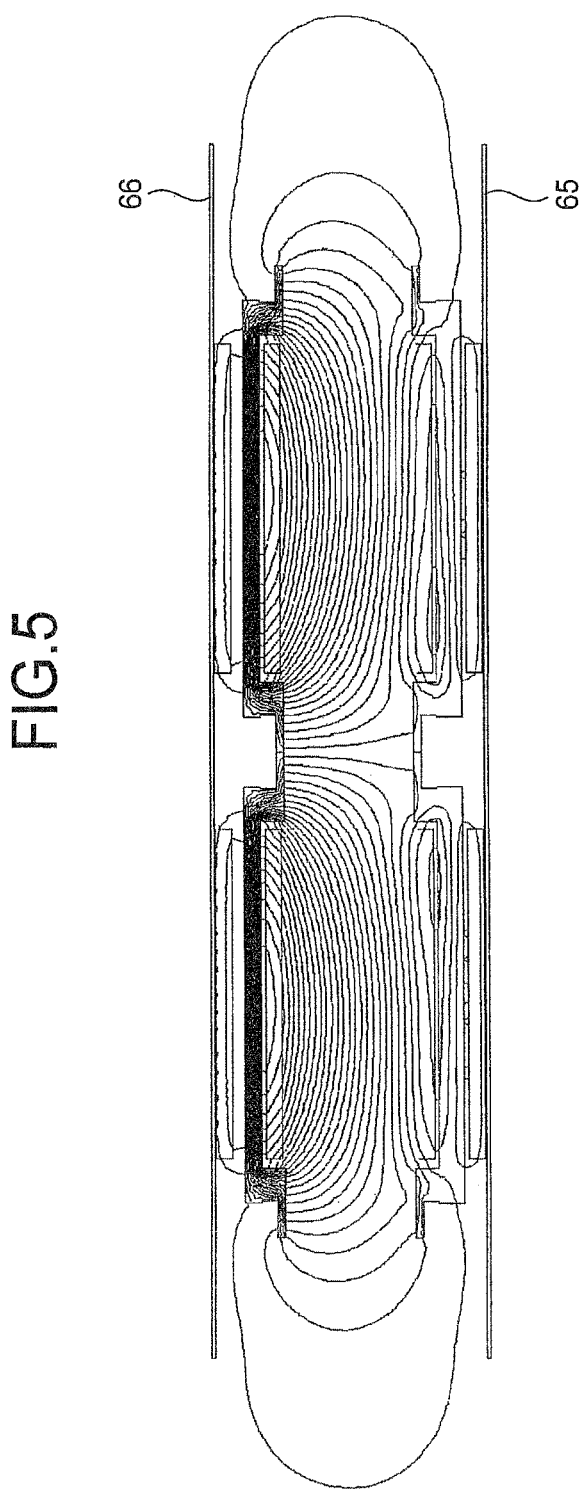
FIG. 5 is a diagram illustrating a distribution of magnetic field lines of a coupled and both-sides wound coil in the contactless power transfer transformer according to the embodiment.
Figure 6:
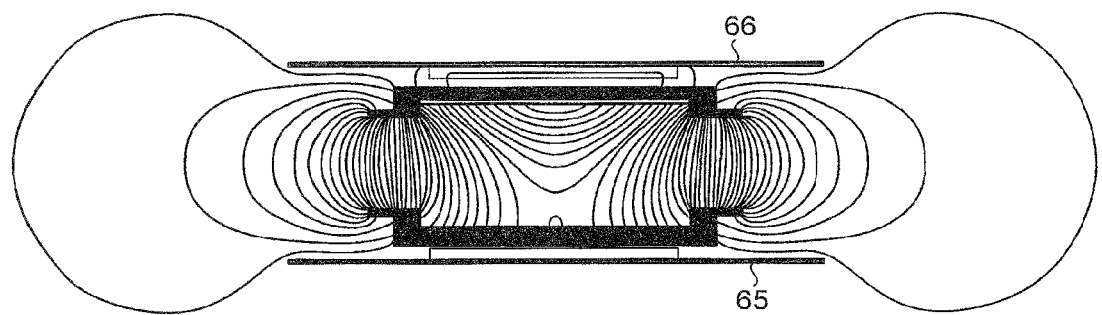
FIG. 6 is a diagram illustrating a distribution of magnetic field lines of a single both-sides wound coil, alone.

FIG. 5 illustrates a distribution of magnetic field lines of the coupled and both-sides wound coil in which the two single both-side wound coils are combined, and is examined by using a magnetic field analyzing software (JMAG-Designer Ver. 11.0). Here, the distribution is of a coupled and both-sides wound coil that performs power transfer of 25 kW by combining two single both-sides wound coils having power transfer capability of 12.5 kW. FIG. 6 illustrates, for comparison, a distribution of magnetic field lines of a single both-sides wound coil, alone, which performs the power transfer of 12.5 kW. 65 and 66 are aluminum plates for magnetic shielding.

In the coupled and both-sides wound coil in which the two single both-sides wound coils are combined, leakage magnetic fields generated from the magnetic cores at both ends of the coupled and both-sides wound coil are the same as that of the single both-sides would coil, alone. However, the leakage magnetic fields generated from the positions of the magnetic pole cores that are connected with each other is weak at a location sufficiently far away because the leakage magnetic fields generated by each of the both-sides wound coils cancel each other at the location sufficiently far away.

Therefore, the coupled and both-sides wound coil in which the two single both-sides wound coils are combined has the power transfer capability that is double the power transfer capability of the single both-sides wound coil, alone. Thus, the strengths of the leakage magnetic fields generated from the end portions become substantially similar to that generated by the single both-sides wound coil, alone.

Therefore, a single both-sides wound coil with small capacity is used as the single both-sides wound coil used for the coupled and both-sides wound coil, and an even number of a plurality of such a single both-sides wound coil are combined. Consequently, it becomes capable of reducing the leakage magnetic field of the coupled and both-sides wound coil. Further, by increasing a number of single both-sides wound coils to be combined, the capacity of the coupled and both-sides wound coil can be increased proportional to the number of the single both-sides wound coil, even if the capacity of each of the both-sides wound coils are small.

Figures 9A, 9B:
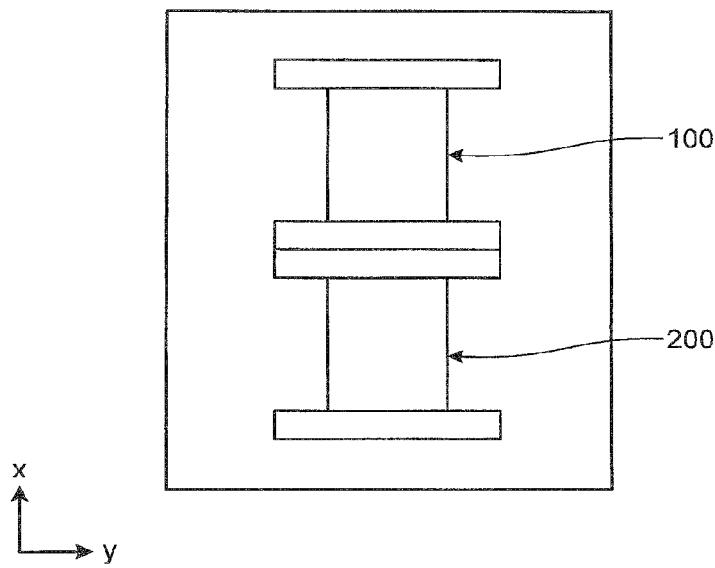
FIG. 9A is a diagram illustrating a configuration of the coupled and both-sides wound coil in the contactless power transfer transformer according to the embodiment for measuring the leakage magnetic flux density.
FIG. 9B is a diagram illustrating a measurement result of the leakage magnetic flux density of the coupled and both-sides wound coil of FIG. 9A.

FIGS. 9A and 9B illustrate results of measurements of the leakage magnetic field of the coupled and both-sides wound coil (the power transfer capability of each of the single both-sides wound coil, alone, is 6.2 kW) that performs power transfer of 12.5 kW by combining the two single both-sides wound coils. As illustrated in FIG. 9A, in the measurement, the center of the two single both-sides wound coils that are combined with each other is taken as a reference point. The relationship between the leakage magnetic flux density ($\mu$T) and a distance from the reference point to a point in the x-direction or a point in the y-direction is obtained, and the result is illustrated in FIG. 9B.

Figures 10A, 10B:
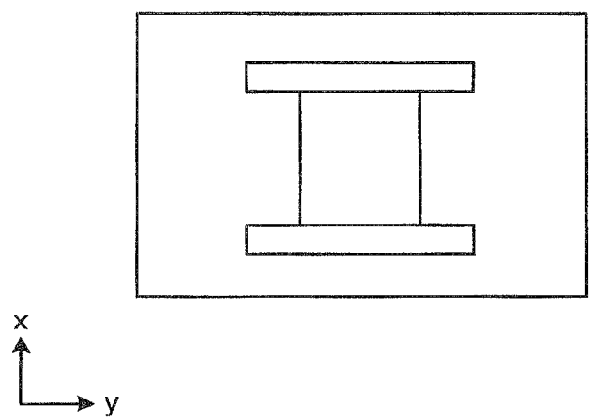
FIG. 10A is a diagram illustrating a configuration of the single both-sides wound coil, alone, for measuring the leakage magnetic flux density.
FIG. 10B is a diagram for illustrating a measurement result of the leakage magnetic flux density in the single both-sides wound coil, alone, of FIG. 10A.

Further, FIGS. 10A and 10B illustrate, for comparison, results of measurements of the leakage magnetic field of a single both-sides wound coil, alone, that performs the power transfer of 10 kW. As illustrated in FIG. 10A, in the measurement, a center of the single both-sides wound coil is taken as a reference point. Then, the relationship between the leakage magnetic flux density ($\mu$T) and a distance from the reference point to a point in the x-direction or a point in the y-direction is obtained, and the result is illustrated in FIG. 10B.

Further, FIG. 11 summarizes the measurement results of FIGS. 9B and 10B as a graph.

As is clear from FIG. 11, although the power transfer power of the coupled and both-sides wound coil in which the two single both-sides wound coils are combined is larger than the power transfer power of the single both-sides wound coil, alone, that performs the power transfer of 10 kW, the leakage magnetic flux is lower than that of the single both-sides wound coil, alone. The decrease ratio of the leakage magnetic flux in the coupled and both-sides wound coil is apparent at a position greater than or equal to 500 mm away from the reference point (transformer center).

The reasons why the leakage magnetic flux of the coupled and both-sides wound coil is small are because: the power transfer power of each of the single both-sides wound coils configuring the coupled and both-sides wound coil is lower than the single both-sides wound coil, alone, having the power transfer capability of 10 kW; and/or the leakage magnetic fluxes of the two single both-sides wound coils cancel each other. Further, the reason why the power transfer power of the coupled and both-sides wound coil is large is because the power transfer capability of the single both-sides wound coil with small capacity is doubled and exceeds 10 kW.

FIG. 12 represents an equation of a best fit curve of change in magnetic flux density within a range of greater than or equal to 500 mm from the transformer center in FIG. 11. The decrease in the leakage magnetic flux of the coupled and both-sides wound coil is apparent not only in the x-direction, which is the arrangement direction of the two single both-sides wound coils, but also apparent in the y-direction. The leakage magnetic flux decreases approximately by the fourth power of the distance from the reference point.

Currently, from the point of view of preventing the health injury due to the magnetic field exposure, there are provided various regulations and standards for the leakage magnetic field. For example, the International Commission on Non-ionizing Radiation Protection (ICNIRP) has published "Reference Levels for General Public Exposure to Time-varying Electric and Magnetic fields (2010)", and specified a value of $2.7 \times 10^{-5}$ as a magnetic flux density within a frequency range between 3 kHz and 10 MHz.

A contactless power transfer transformer that satisfies the above-mentioned standards, further satisfies strict regulation value of the leakage magnetic flux specified within the corporation, and has a desired capacity, can be manufactured by the following steps.

A single both-sides wound coil in which the leakage magnetic flux around the vehicle does not exceed the regulation value is selected when a coupled and both-sides wound coil in which two single both-sides wound coils are combined is installed at a install position at the bottom face of the vehicle. Next, a desired capacity of the contactless power transfer transformer is divided by capacity of one of the single both-sides wound coils to obtain a required number of single both-sides wound coils. Then, the single both-sides wound coils of the obtained number are combined to manufacture the coupled and both-sides wound coil.

At this time, it is important that the number of the single both-sides wound coils combined in the coupled and both-sides wound coil is set to be an even number in order to reduce the leakage magnetic flux. If the leakage magnetic field is not of an issue, then the coupled and both-sides wound coil may be configured by the both-sides wound coils of odd number (greater than or equal to three). Even when the both-sides wound coils of greater than or equal to three and of odd number are provided, the leakage magnetic fields by the consecutive single both-sides wound coils of the even number cancel each other, thereby the increase in the leakage magnetic field can be suppressed for a certain amount.

As described above, a method for combining a required number of the single both-sides wound coils can reduce the leakage magnetic flux, and also can easily increase the capacity in accordance with the number of single both-sides wound coils combined. Therefore, the production operability is improved, and the reduction of the production cost can be decreased.

The leakage magnetic field at the outer perimeter of the vehicle of when the coupled and both-sides wound coil used for the measurement of the leakage magnetic field of FIG. 9B is installed at the install position at the center and the bottom of the vehicle sufficiently satisfies the reference levels of the ICNIRP.

Figure 13A:
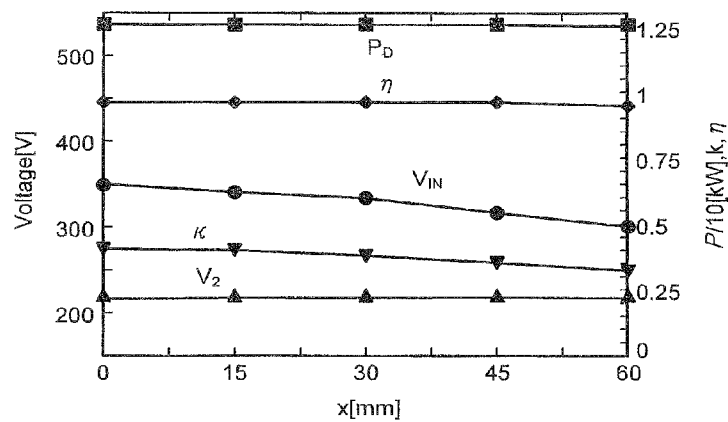
FIG. 13A is a diagram illustrating change in property in accordance with a positional variation in x-direction in the contactless power transfer transformer according to the embodiment.
Figure 13B:
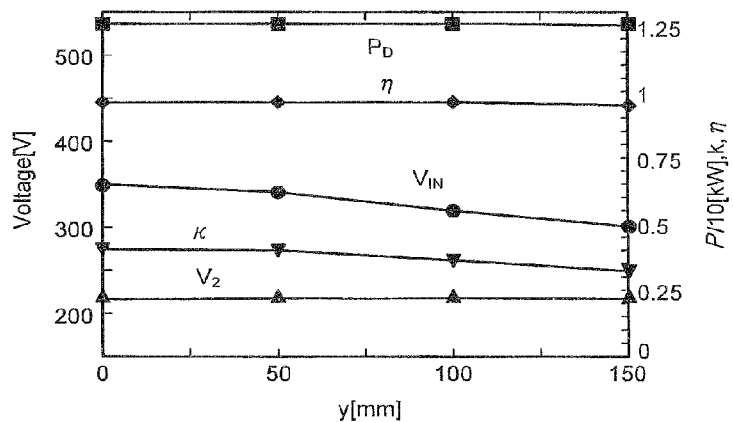
FIG. 13B is a diagram illustrating change in property in accordance with the positional variation in y-direction in the contactless power transfer transformer according to the embodiment.
Figure 13C:
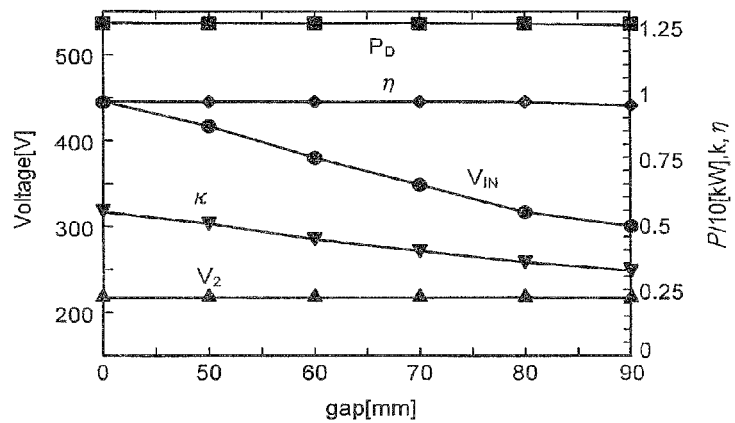
FIG. 13C is a diagram illustrating change in property in accordance with a variation in a gap length in the contactless power transfer transformer according to the embodiment.

Further, FIGS. 13A to 13C illustrates changes in properties in accordance with a positional variation and a gap variation between the power transmission coil and the power reception coil comprised in the coupled and both-sides wound coil. FIG. 13A illustrates change in a power transfer power (PD), a power transfer efficiency ($\eta$), an input voltage (VIN), a coupling coefficient (k) and an output voltage (V2) of when a position is changed within a range of ±60 mm in the x-direction. FIG. 13B illustrates change in each value of when a position is changed within a range of ±150 mm in the y-direction. FIG. 13C illustrates change in each value of when the gap length is changed within a range between 40 mm and 90 mm. Here, the input voltage (VIN) is adjusted so that PH is at constant.

As is clear from FIGS. 13A to 13C, the contactless power transfer transformer permits large positional variation and gap variation.

In the coupled and both-sides wound coil, the winding wires of the plurality of the single both-sides wound coils can be connected to each other in series or in parallel, as illustrated in FIGS. 1A, 1B, 3A, and 3B. In case when the winding wires of the single both-sides wound coils 100, 200 are connected in series as illustrated in FIGS. 1A and 1B, the same current flows through both winding wires. Thus, if positions of the power transmission coil and the power reception coil comprised in the coupled and both-sides wound coil differ from each other, the unbalance of the current in the both-side wound coils 100, and 200 will not be caused. However, if the winding wires are connected in series, the voltage between the terminals becomes high.

On the other hand, if the winding wires of the single both-sides wound coils 100, 200 are connected in parallel as illustrated in FIGS. 3A and 3B, the voltage between the terminals is reduced to ½ of that of when the winding wires of the single both-sides wound coils are connected to each other in series. Accordingly, it can easily be handled. However, if positions of the power transmission coil and the power reception coil comprised in the coupled and both-sides wound coil differ from each other, the current flowing through the both-sides wound coils 100 and 200 might be unbalanced.

Therefore, it is preferred to connect the winding wires of the two single both-sides wound coils in one of the power transmission coil and the power reception coil in series and the winding wires of the two single both-sides wound coils in other one of the power transmission coil and the power reception coil in parallel so as to balance the currents.

Figure 14A:
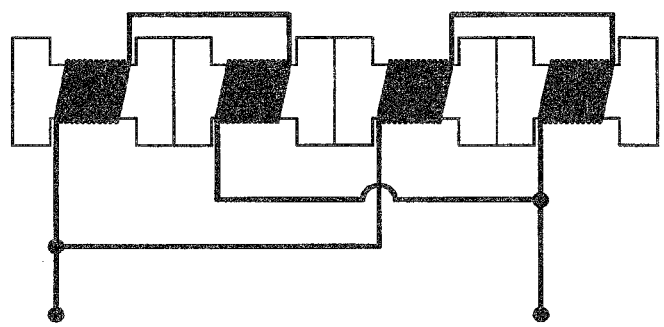
FIG. 14A is a diagram illustrating a mode of electric connection of the coupled and both-sides wound coil configured by the single both-sides wound coils of "2 times 2 pairs"
Figure 14B:
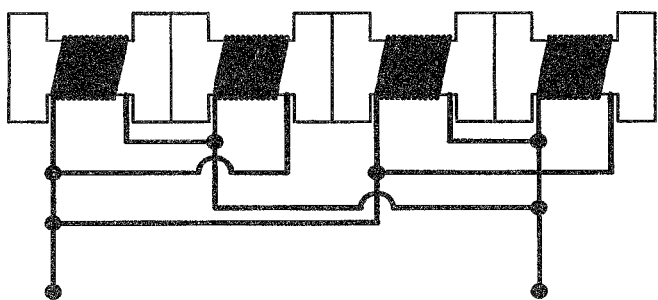
FIG. 14B is a diagram illustrating another example of the mode of the electric connection of the coupled and both-sides wound coil configured by the single both-sides wound coils of "2 times 2 pairs"

Further, as illustrated in FIGS. 14A and 14B, the coupled and both-sides wound coil can be configured by combining a pair of two single both-sides wound coils in the following manner. In particular, in one of the power transmission coil and the power reception coil, as illustrated in FIG. 14A, winding wires of each of the two both-sides wound coils in each of the pair are connected to each other in series, and winding wires of each of the pair of the single both-sides wound coils are connected to each other in parallel. Further, in other one of the power transmission coil and the power reception coil, as illustrated in FIG. 14B, winding wires of each of the two single both-sides wound coils in each of the pair are connected to each other in parallel, and winding wires of each of the pair of the both-sides wound coils are connected to each other in parallel. In such a case, the currents are balanced by employing the series connection within the parallel connection.

Figure 15A:
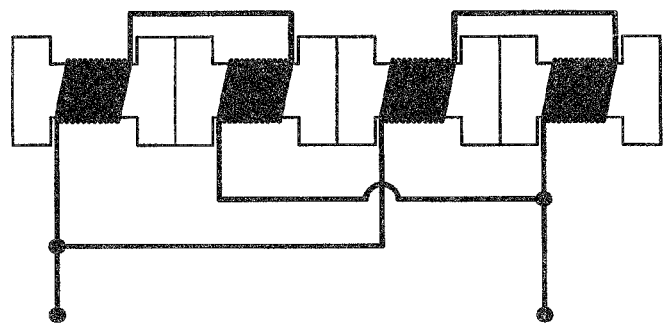
FIG. 15A is a diagram illustrating still another example of the mode of the electric connection of the coupled and both-sides wound coil configured by the single both-sides wound coils of "2 times 2 pairs"
Figure 15B:
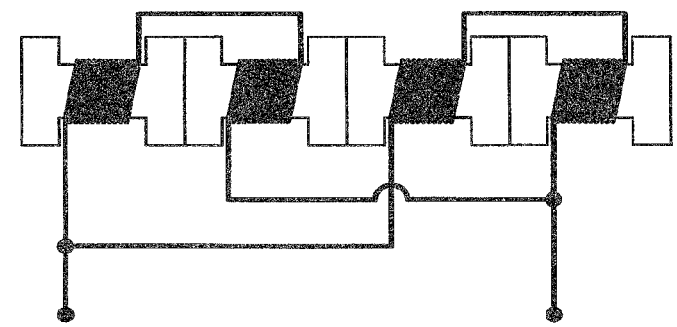
FIG. 15B is a diagram illustrating still another example of the mode of the electric connection of the coupled and both-sides wound coil configured by the single both-sides wound coils of "2 times 2 pairs"

Further, as illustrated in FIGS. 15A and 15B, the coupled and both-sides wound coil can be configured by combining a pair of the two single both-sides wound coils in the following manner. In particular, as illustrated in FIGS. 15A and 15B, in the power transmission coil and the power reception coil, winding wires of each of the two single both-sides wound coils in each of the pair are connected to each other in series. Further, winding wires of each of the pair of the single both-sides wound coils are connected to each other in series. In such a case, the currents can be balanced by employing the series connection within the parallel connection.

In FIGS. 14A, 14B, 15A, and 15B, the pair of the two single both-sides wound coils are mentioned. However, the pair can be greater than or equal to one pair (m number of pairs: m is a natural number).

Figure 16:
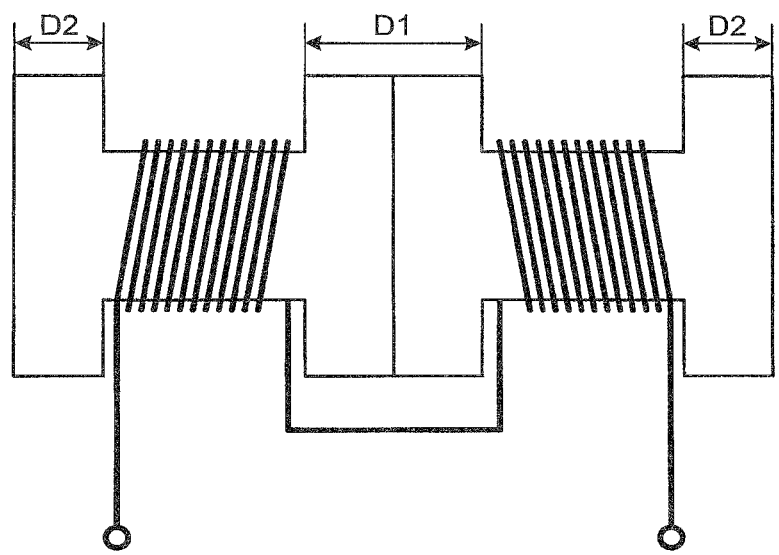
FIG. 16 is a diagram illustrating a modification in which widths of the connected magnetic pole portions of the coupled and both-sides wound coil are decreased.
Figure 17:
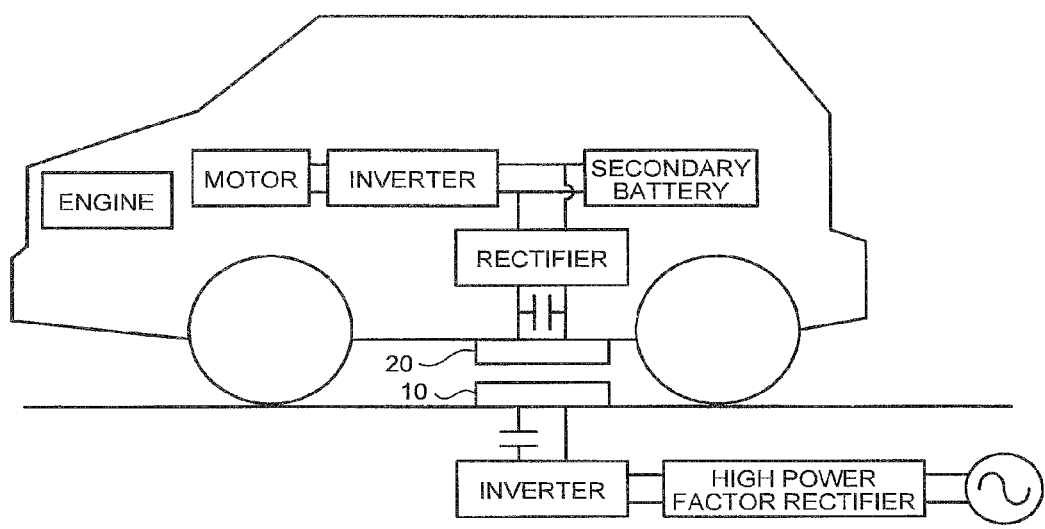
FIG. 17 is a diagram illustrating a contactless power transfer system for a car.
Figure 18A:
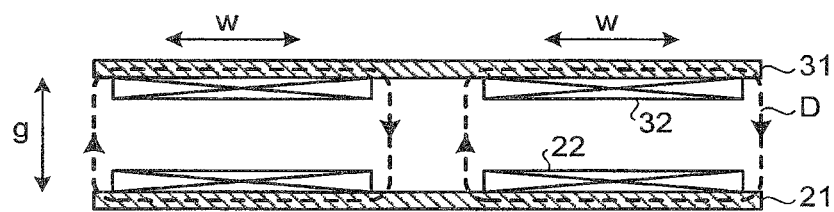
FIG. 18A is a cross sectional view illustrating a conventional one-side wound coil.
Figure 18B:
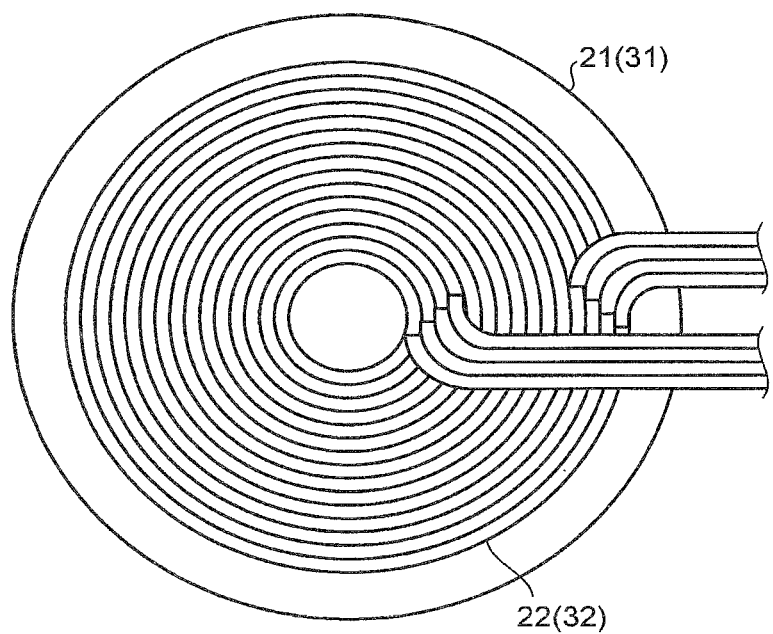
FIG. 18B is a plan view of FIG. 18A.

Further, as illustrated in FIG. 16, in the coupled and both-sides wound coil, a width D1 (width of the both-sides wound coils in the arrangement direction) obtained by adding the widths of the magnetic pole portions that are connected to each other can be set to D1<2×D2 where D2 is a width of the magnetic pole portion positioned at an end portion of the coupled and both-sides wound coil.

The width becomes double at the position at which the single both-sides wound coils are adjacent to each other because the magnetic pole portions of the two single both-sides wound coils are connected to each other. Therefore, each width of the magnetic pole portions connected to each other can be set thinner without any problem, in order to reduce weight of the single both-sides wound coils or to shorten the coupled and both-sides wound coil.

Figure 19A:
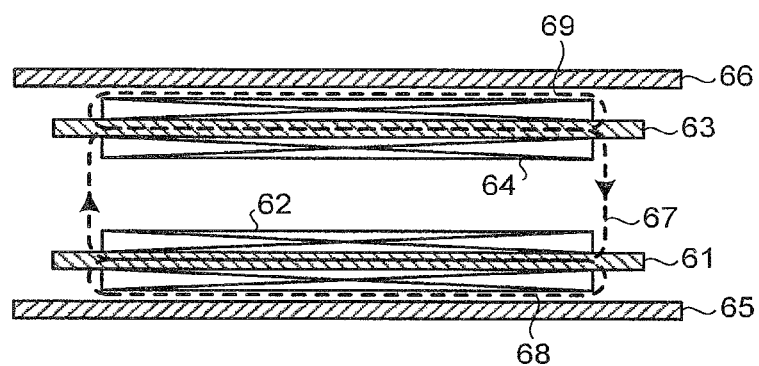
FIG. 19A is a cross sectional view illustrating a both-sides wound coil which uses a conventional square core.
Figure 19B:
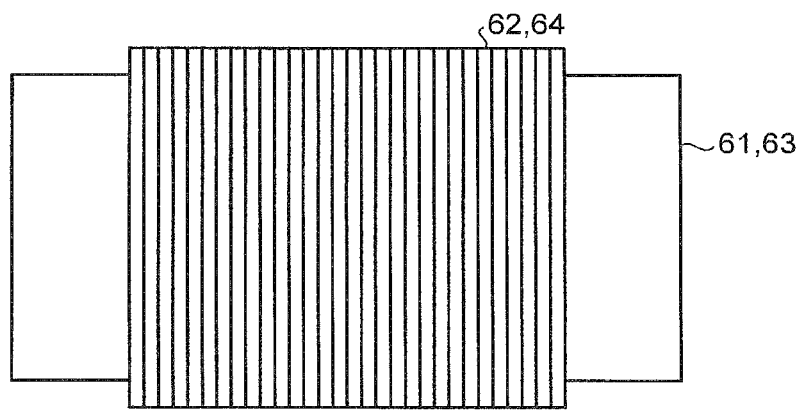
FIG. 19B is a plan view of FIG. 19A.
Figure 20A:
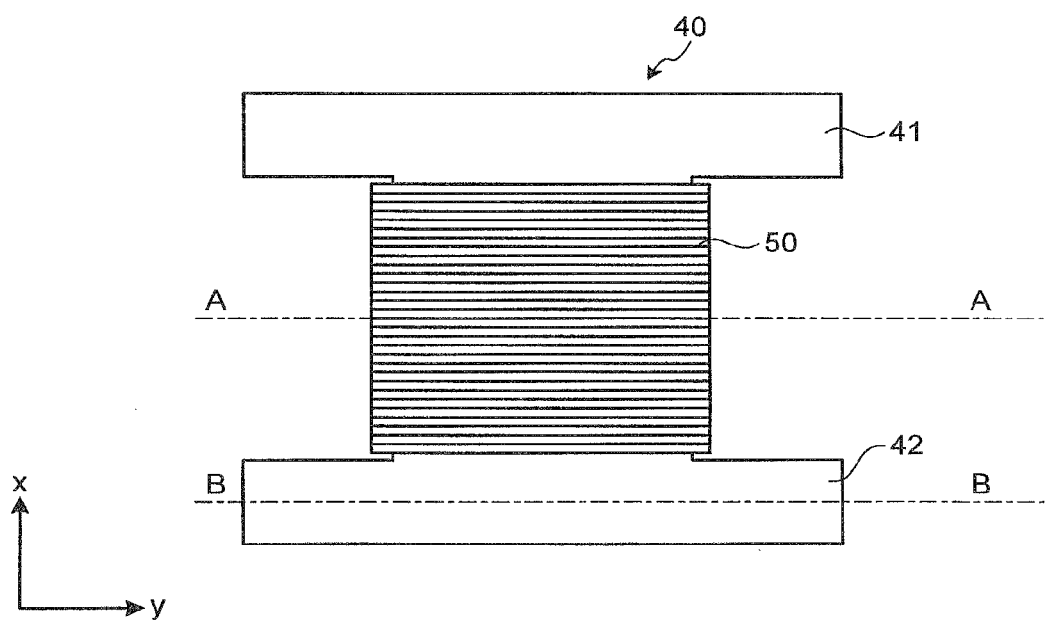
FIG. 20A is a diagram explaining a both-sides wound coil which uses a conventional H-shape core, and illustrating a state in which a winding wire is wound.
Figure 20B:
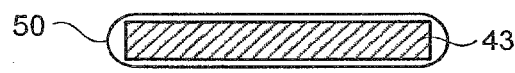
FIG. 20B is a cross sectional view taken along a line A-A of FIG. 20A.
Figure 20C:
FIG. 20C is a cross sectional view taken along a line B-B of FIG. 20A.
Figure 20D:
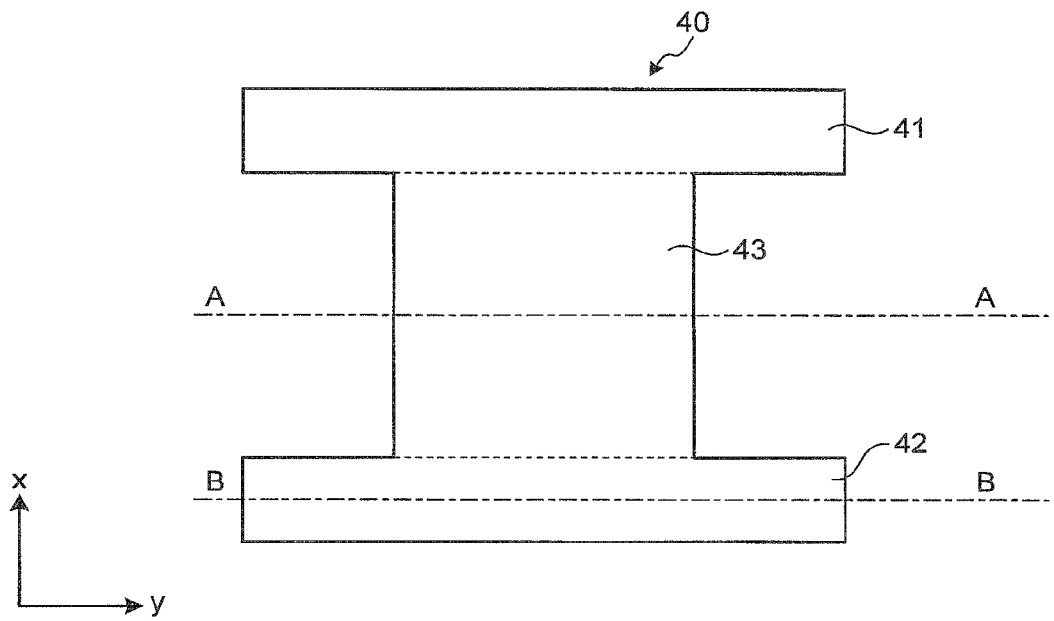
FIG. 20D is a diagram explaining a both-sides wound coil which uses a conventional H-shape core, and illustrating a state in which a winding wire is not wound.
Figure 20E:
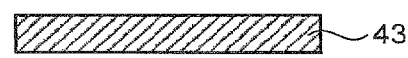
FIG. 20E is a cross sectional view taken along a line A-A of FIG. 20D.
Figure 20F:
FIG. 20F is a cross sectional view taken along a line B-B of FIG. 20D.

In the above, it is explained a case in which the single both-sides wound coil has the H-shape core. However, as illustrated in FIG. 19B, the single both-sides wound coil may have a square shape core.

A contactless power transfer transformer according to the present invention can increase capacity while maintaining the leakage magnetic field low. Thus, the contactless power transfer transformer can widely be used for contactless power transfer with respect to various moving bodies such as an electric vehicle or a plug-in hybrid car.

REFERENCE SIGNS LIST

10 POWER TRANSMISSION COIL
20 POWER RECEPTION COIL
21 FERRITE MAGNETIC CORE
31 FERRITE MAGNETIC CORE
40 H-SHAPE FERRITE CORE
41 MAGNETIC POLE PORTION
42 MAGNETIC POLE PORTION
43 WOUND PORTION
50 WINDING WIRE PORTION
61 SQUARE FERRITE CORE
62 WINDING WIRE
63 SQUARE FERRITE CORE
64 WINDING WIRE
65 ALUMINUM PLATE
66 ALUMINUM PLATE
67 MAIN MAGNETIC FLUX
68 LEAKAGE MAGNETIC FLUX
69 LEAKAGE MAGNETIC FLUX
80 MAGNETIC POLE CORE
81 WINDING WIRE CORE
82 LOWER LAYER FERRITE PLATE
100 BOTH-SIDES WOUND COIL
150 WINDING WIRE
180 MAGNETIC POLE CORE
181 WINDING WIRE CORE
200 BOTH-SIDES WOUND COIL
250 WINDING WIRE
280 MAGNETIC POLE CORE
281 WINDING WIRE CORE

The invention claimed is:

1. A contactless power transfer transformer for a moving body, comprising:
a power transmission coil; and
a power reception coil installed on the moving body,
wherein contactless power transfer is performed when the moving body is moved to a power transfer position at which the power transmission coil and the power reception coil oppose each other,
wherein at least one of the power transmission coil and the power reception coil comprise a respective coupled and both-sides wound coil, each coupled and both-sides wound coil comprising:
a plurality of single both-sides wound coils, each single both-sides wound coil comprising:
a winding wire wound around a wound portion along a winding axis between magnetic pole portions of a respective core;
wherein the plurality of single both-sides wound coils of each coupled and both-sides wound coil are positioned such that the winding axes of each of the single both-sides wound coils are arranged collinearly with respect to each other, and such that the magnetic pole portions of each of the single both-sides wound coils are connected to adjacent magnetic pole portions of adjacent single both-sides wound coils; wherein the plurality of single both-sides wound coils of each coupled and both-sides wound coil are arranged such that when a current flows through the plurality of single both-sides wound coils, magnetic fluxes generated between each adjacent pair of single both-sides wound coils in a vertical direction perpendicular to the winding axes of the single both-sides wound coils are identical, thereby reducing a leakage magnetic flux around the moving body during the contactless power transfer and increasing power transfer capacity of the contactless power transfer transformer based on the number of single both-sides wound coils comprising each coupled and both-sides wound coil, wherein
both the power transmission coil and the power reception coil each comprise a respective coupled and both-sides wound coil that comprises a combination of two single both-sides wound coils,
in the coupled and both-sides wound coil of the power transmission coil, winding wires of the two single both-sides wound coils are electrically connected to each other in series, and
in the coupled and both-sides wound coil of the power reception coil, the winding wires of the two single both-sides wound coils are electrically connected to each other in parallel.

2. The contactless power transfer transformer for the moving body of claim 1, wherein the power reception coil is positioned on a bottom face of the moving body so that an arrangement direction of the single both-sides wound coils in the coupled and both-sides wound coil of the power reception coil coincides with a front and back direction of the moving body.

3. The contactless power transfer transformer for the moving body of claim 1, wherein each of the cores of each of the single both-sides wound coils are an H-shape core formed by arranging the wound portion between the magnetic pole portions which extend perpendicularly to the wound portion.

4. The contactless power transfer transformer for the moving body of claim 3, wherein a combined width of two adjacent magnetic pole portions of two single both-sides wound coils of each coupled and both-sides wound coil is D1 and a width of a magnetic pole portion at an end of each coupled and both-sides wound coil is D2, D1<2×D2.

5. A contactless power transfer transformer for a moving body, comprising:
a power transmission coil; and
a power reception coil installed on the moving body,
wherein contactless power transfer is performed when the moving body is moved to a power transfer position at which the power transmission coil and the power reception coil oppose each other,
wherein at least one of the power transmission coil and the power reception coil comprise a respective coupled and both-sides wound coil, each coupled and both-sides wound coil comprising:
a plurality of single both-sides wound coils, each single both-sides wound coil comprising:
a winding wire wound around a wound portion along a winding axis between magnetic pole portions of a respective core;
wherein the plurality of single both-sides wound coils of each coupled and both-sides wound coil are positioned such that the winding axes of each of the single both-sides wound coils are arranged collinearly with respect to each other, and such that the magnetic pole portions of each of the single both-sides wound coils are connected to adjacent magnetic pole portions of adjacent single both-sides wound coils; wherein the plurality of single both-sides wound coils of each coupled and both-sides wound coil are arranged such that when a current flows through the plurality of single both-sides wound coils, magnetic fluxes generated between each adjacent pair of single both-sides wound coils in a vertical direction perpendicular to the winding axes of the single both-sides wound coils are identical, thereby reducing a leakage magnetic flux around the moving body during the contactless power transfer and increasing power transfer capacity of the contactless power transfer transformer based on the number of single both-sides wound coils comprising each coupled and both-sides wound coil, wherein,
both the power transmission coil and the power reception coil each comprise a respective coupled and both-sides wound coil that each comprise a combination of m pairs of two single both-sides wound coils, and wherein m>=2,
in the coupled and both-sides wound coil of one of the power transmission coil and the power reception coil, the winding wires of each of the two single both-sides wound coils in each of the m pairs of the two single both-sides wound coils are electrically connected to each other in series, and winding wires of each of the m pairs of the two single both-sides wound coils are electrically connected to each other in parallel, and
in the coupled and both-sides wound coil of the other one of the power transmission coil and the power reception coil, the winding wires of each of the two single both-sides wound coils in each of the m pairs of the two single both-sides wound coils are electrically connected to each other in parallel, and the winding wires of each of the m pairs of the two single both-sides wound coils are electrically connected to each other in parallel.

6. The contactless power transfer transformer for the moving body of claim 5, wherein the power reception coil is positioned on a bottom face of the moving body so that an arrangement direction of the single both-sides wound coils in the coupled and both-sides wound coil of the power reception coil coincides with a front and back direction of the moving body.

7. The contactless power transfer transformer for the moving body of claim 5, wherein each of the cores of each of the single both-sides wound coils are H-shape cores formed by arranging the wound portion between the magnetic pole portions which extend perpendicularly to the wound portion.

8. The contactless power transfer transformer for the moving body of claim 7, wherein a combined width of two adjacent magnetic pole portions of two single both-sides wound coils of each coupled and both-sides wound coil is D1 and a width of a magnetic pole portion at an end of each coupled and both-sides wound coil is D2, D1<2×D2.

9. A contactless power transfer transformer for a moving body, comprising:
a power transmission coil; and
a power reception coil installed on the moving body,
wherein contactless power transfer is performed when the moving body is moved to a power transfer position at which the power transmission coil and the power reception coil oppose each other,
wherein at least one of the power transmission coil and the power reception coil comprise a respective coupled and both-sides wound coil, each coupled and both-sides wound coil comprising:
a plurality of single both-sides wound coils, each single both-sides wound coil comprising:
a winding wire wound around a wound portion along a winding axis between magnetic pole portions of a respective core;
wherein the plurality of single both-sides wound coils of each coupled and both-sides wound coil are positioned such that the winding axes of each of the single both-sides wound coils are arranged collinearly with respect to each other, and such that the magnetic pole portions of each of the single both-sides wound coils are connected to adjacent magnetic pole portions of adjacent single both-sides wound coils; wherein the plurality of single both-sides wound coils of each coupled and both-sides wound coil are arranged such that when a current flows through the plurality of single both-sides wound coils, magnetic fluxes generated between each adjacent pair of single both-sides wound coils in a vertical direction perpendicular to the winding axes of the single both-sides wound coils are identical, thereby reducing a leakage magnetic flux around the moving body during the contactless power transfer and increasing power transfer capacity of the contactless power transfer transformer based on the number of single both-sides wound coils comprising each coupled and both-sides wound coil, wherein,
both the power transmission coil and the power reception coil comprise a respective coupled and both-sides wound coil that each comprise a combination of m pairs of two single both-sides wound coils, and wherein m>=2, and in each coupled and both-sides wound coil, the winding wires of each of the two single both-sides wound coils in each of the m pairs of the two single both-sides wound coils are electrically connected to each other in series, and the winding wires of each of the m pairs of the single both-sides wound coils are electrically connected to each other in parallel.

10. The contactless power transfer transformer for the moving body of claim 9, wherein the power reception coil is positioned on a bottom face of the moving body so that an arrangement direction of the single both-sides wound coils in the coupled and both-sides wound coil of the power reception coil coincides with a front and back direction of the moving body.

11. The contactless power transfer transformer for the moving body of claim 9, wherein each of the cores of each of the single both-sides wound coils are H-shape cores formed by arranging the wound portion between the magnetic pole portions which extend perpendicularly to the wound portion.

12. The contactless power transfer transformer for the moving body of claim 11, wherein a combined width of two adjacent magnetic pole portions of two single both-sides wound coils of each coupled and both-sides wound coil is $D1$, and a width of a magnetic pole portion at an end of each coupled and both-sides wound coil is $D2$, $D1<2\times D2$.

* * * * *